United States Patent
Lee

(10) Patent No.: US 12,389,071 B2
(45) Date of Patent: Aug. 12, 2025

(54) GENERATION OF DEVICE SETTING RECOMMENDATIONS BASED ON USER ACTIVENESS IN CONFIGURING MULTIMEDIA OR OTHER USER DEVICE SETTINGS

(71) Applicant: Samsung Electronics Co., Ltd., Suwon-si (KR)

(72) Inventor: Ho Sub Lee, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 18/299,544

(22) Filed: Apr. 12, 2023

(65) Prior Publication Data

US 2023/0388592 A1   Nov. 30, 2023

Related U.S. Application Data

(60) Provisional application No. 63/346,688, filed on May 27, 2022.

(51) Int. Cl.
*H04N 21/466* (2011.01)
*H04N 21/485* (2011.01)

(52) U.S. Cl.
CPC ..... *H04N 21/4667* (2013.01); *H04N 21/4852* (2013.01); *H04N 21/4854* (2013.01)

(58) Field of Classification Search
CPC ........... H04N 21/4854; H04N 21/4667; H04N 21/4852
See application file for complete search history.

(56) References Cited

U.S. PATENT DOCUMENTS

| | | |
|---|---|---|
| 7,818,271 B2 | 10/2010 | Groble |
| 8,086,480 B2 | 12/2011 | Deo et al. |
| 11,107,020 B2 * | 8/2021 | Faulkner ................ G06Q 10/10 |
| | (Continued) | |

FOREIGN PATENT DOCUMENTS

| | | | | |
|---|---|---|---|---|
| EP | 3119094 A1 * | 1/2017 | ............. | G06N 20/00 |
| WO | WO-2021047432 A1 * | 3/2021 | ............. | G06F 21/10 |

OTHER PUBLICATIONS

Lee et al., "Data-driven approaches for discovery and prediction of user-preferred picture settings on Smart TVs," IMX '21, Jun. 2021, 10 pages.

(Continued)

*Primary Examiner* — Ricky Chin

(57) ABSTRACT

A method includes obtaining device usage log data associated with multiple user devices. The device usage log data is related to device settings associated with the user devices, where each device setting associated with the user devices is adjustable by users of the user devices. The method also includes obtaining one or more metrics representing each user's activeness in customizing one or more device settings of the user device associated with the user based on the device usage log data. The method further includes clustering the users into multiple groups based on the metric(s) and identifying at least one of the groups as being at least one valid user group. In addition, the method includes providing one or more recommendations of at least one customized device setting to one or more of the user devices based on the device usage log data associated with the valid user group(s).

20 Claims, 12 Drawing Sheets

(56) References Cited

U.S. PATENT DOCUMENTS

| | | | | |
|---|---|---|---|---|
| 2015/0264432 | A1* | 9/2015 | Cheng | H04N 21/462 |
| | | | | 725/10 |
| 2016/0260296 | A1* | 9/2016 | Shirriff | G08B 5/22 |
| 2017/0139919 | A1* | 5/2017 | Ball | G06F 16/24578 |
| 2018/0367843 | A1* | 12/2018 | Han | H04N 21/41407 |
| 2019/0139027 | A1* | 5/2019 | Zarakas | G07F 7/0846 |
| 2019/0327526 | A1* | 10/2019 | Navin | H04N 21/25891 |
| 2020/0034169 | A1* | 1/2020 | Deore | G06F 9/45558 |
| 2020/0344411 | A1* | 10/2020 | Cragg | H04N 23/64 |
| 2020/0389740 | A1* | 12/2020 | Sabin | H04R 25/507 |
| 2021/0266358 | A1* | 8/2021 | Cady | G06N 3/08 |
| 2021/0409976 | A1* | 12/2021 | Ergen | H04W 72/541 |
| 2022/0030102 | A1* | 1/2022 | Lee | G06N 20/00 |
| 2022/0182718 | A1* | 6/2022 | Yelda | H04L 67/568 |
| 2022/0284340 | A1* | 9/2022 | Choudhary | G06N 20/10 |
| 2023/0108310 | A1* | 4/2023 | Jiang | H04N 21/242 |
| | | | | 725/116 |
| 2023/0118443 | A1* | 4/2023 | Darji | G06F 3/0653 |
| | | | | 707/722 |
| 2023/0388592 | A1* | 11/2023 | Lee | H04N 21/4852 |

OTHER PUBLICATIONS

Minitab Statistical Software, "Interpret all statistics and graphs for cluster K-Means," 2022, 4 pages.

Wikipedia.org, "Silhouette (clustering)—Wikipedia," web.archive.org, Apr. 2022, 8 pages.

Wikipedia.org, "k-means clustering," web.archive.org, Apr. 2022, 18 pages.

Wikipedia.org, "Association rule learning," web.archive.org, Feb. 2022, 18 pages.

Github.com, "nicodv/kmodes: Python implementations of the k-modes and k-prototypes clustering algorithms, for clustering categorical data," Feb. 2020, 7 pages.

\* cited by examiner

FIG. 4B

| picture_mode | brightness | contrast | shadow_detail | sharpness | color | tint | picture_clarity | blur | judder | led_clear_motion | local_dimming | contrast_enhancer | color_tone | gamma_value |
|---|---|---|---|---|---|---|---|---|---|---|---|---|---|---|
| DYNAMIC | 50 | 50 | 0 | 12 | 30 | 15 | OFF | 10 | 8 | OFF | HIGH | HIGH | COOL | 2 |
| DYNAMIC | 50 | 50 | 0 | 12 | 30 | 15 | AUTO | 10 | 8 | OFF | HIGH | HIGH | COOL | 0 |
| DYNAMIC | 50 | 50 | 0 | 12 | 30 | 15 | AUTO | 10 | 8 | OFF | HIGH | HIGH | COOL | 0 |
| DYNAMIC | 50 | 50 | 0 | 12 | 30 | 15 | AUTO | 10 | 8 | OFF | HIGH | HIGH | COOL | 0 |
| DYNAMIC | 50 | 50 | 0 | 12 | 30 | 15 | AUTO | 10 | 8 | OFF | HIGH | HIGH | COOL | 2 |
| DYNAMIC | 50 | 50 | 0 | 12 | 30 | 15 | OFF | 10 | 8 | OFF | HIGH | HIGH | COOL | 0 |
| STANDARD | 39 | 50 | 0 | 10 | 25 | 15 | AUTO | 10 | 8 | OFF | LOW | HIGH | STANDARD | 0 |
| DYNAMIC | 50 | 50 | 0 | 12 | 30 | 15 | AUTO | 10 | 8 | OFF | HIGH | HIGH | COOL | 0 |
| DYNAMIC | 50 | 50 | 0 | 12 | 30 | 15 | AUTO | 10 | 8 | OFF | HIGH | HIGH | COOL | 0 |
| DYNAMIC | 50 | 50 | 0 | 12 | 30 | 15 | AUTO | 10 | 8 | OFF | HIGH | HIGH | COOL | 2 |
| DYNAMIC | 50 | 50 | 0 | 12 | 30 | 15 | OFF | 10 | 8 | OFF | HIGH | HIGH | COOL | 2 |
| DYNAMIC | 50 | 50 | 0 | 12 | 30 | 15 | AUTO | 10 | 8 | OFF | HIGH | HIGH | COOL | 0 |
| DYNAMIC | 50 | 50 | 0 | 12 | 30 | 15 | AUTO | 10 | 8 | OFF | HIGH | HIGH | COOL | 0 |
| MOVIE | 29 | 45 | 0 | 0 | 25 | 15 | CUSTOM | 10 | 3 | OFF | LOW | OFF | WARM2 | 0 |

400

| Feature Name | Definition |
|---|---|
| total_num_entry_setting_menu | Total number of entries into device setting screen for a given time period (such as 2 months) |
| avg_num_entry_setting_menu | Average number of entries into device setting screen for a given time period (such as per day) |
| total_time_setting_menu | Total time (such as in seconds) spent in device setting screen for a given time period (such as 2 months) |
| avg_time_setting_menu | Average time (such as in seconds) spent in device setting screen for a given time period (such as per day) |
| total_num_used_presets | Total number of used presets (such as picture or audio modes) for a given time period (such as 2 months) |
| avg_num_used_presets | Average number of used presets (such as picture or audio modes) for a given time period (such as per week) |
| total_len_seq_used_presets | Total length of sequence of consecutive nonduplicated used presets for a given time period (such as 6 months) |
| avg_len_seq_used_presets | Average length of sequence of consecutive nonduplicated used presets for a given time period (such as per month) |
| num_customization_all_presets | Number of distinct device setting configurations regardless of a currently-selected preset for a given time period |
| num_customization_preset_N | Number of distinct device setting configurations for a specific preset (such as "Movie" picture mode) for a given time period |

FIG. 5

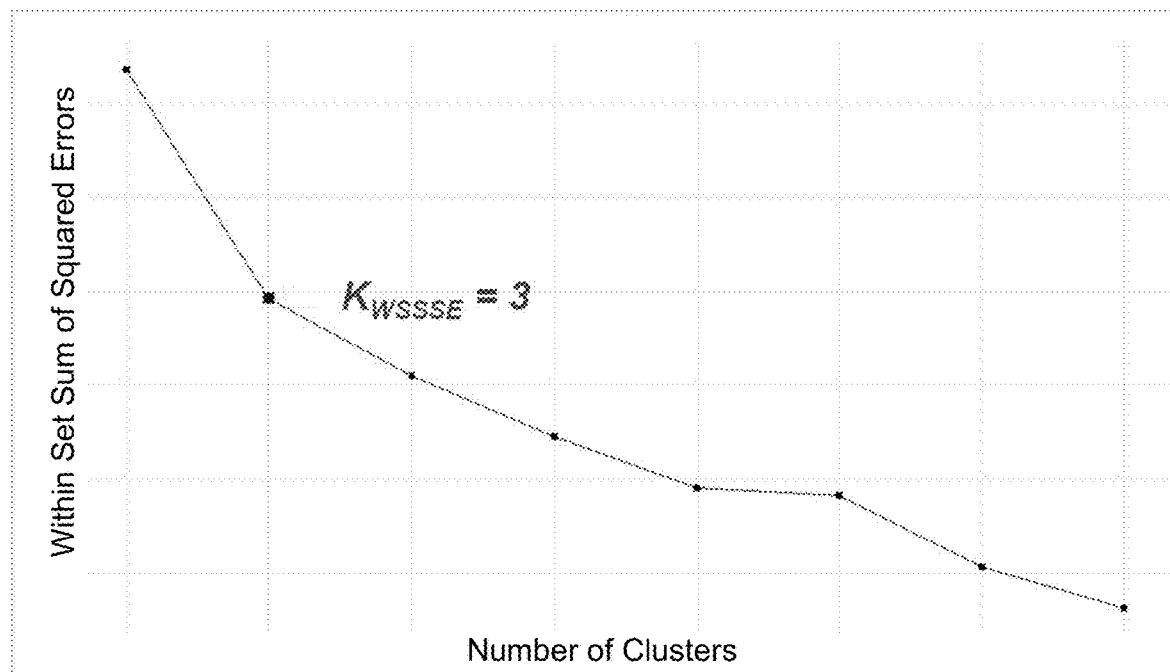
FIG. 9B  ⌐940
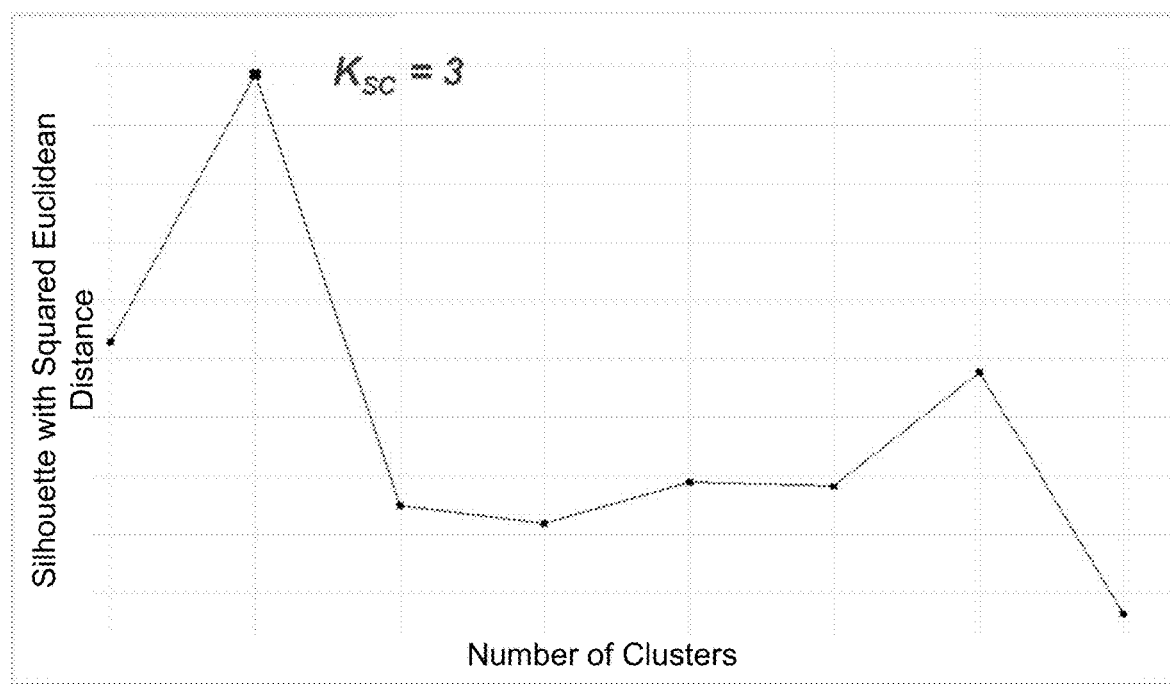
FIG. 9C  ⌐960

GENERATION OF DEVICE SETTING RECOMMENDATIONS BASED ON USER ACTIVENESS IN CONFIGURING MULTIMEDIA OR OTHER USER DEVICE SETTINGS

CROSS-REFERENCE TO RELATED APPLICATION AND PRIORITY CLAIM

This application claims priority under 35 U.S.C. § 119(e) to U.S. Provisional Patent Application No. 63/346,688 filed on May 27, 2022, This provisional application is hereby incorporated by reference in its entirety.

TECHNICAL HELD

This disclosure relates generally to electronic devices. More specifically, this disclosure relates to the generation of device setting recommendations based on user activeness in configuring multimedia or other user device settings.

BACKGROUND

Various types of user devices have multiple settings that can be adjusted by users in order to alter operations of the user devices. For example, audio/visual devices (including multimedia devices) typically include various device settings that can control how audio or visual content is presented to users. As a particular example, televisions, computer monitors, and other display devices often support different picture modes, where each picture mode has specific settings related to brightness, contrast, color, sharpness, or other image characteristics. In many instances, display devices support a number of preset or predefined picture modes (such as standard, dynamic, natural, movie, or other modes), and the display devices allow users to adjust certain settings in order to create customized picture modes. Similar approaches may be used for surround-sound audio receivers and other audio devices, which can support preset and customized audio modes.

SUMMARY

This disclosure relates to the generation of device setting recommendations based on user activeness in configuring multimedia or other user device settings.

In a first embodiment, a method includes obtaining, using at least one processing device, device usage log data associated with multiple user devices. The device usage log data is related to device settings associated with the user devices, where each device setting associated with the user devices is adjustable by users of the user devices. The method also includes obtaining, using the at least one processing device, one or more metrics representing each user's activeness in customizing one or more device settings of the user device associated with the user based on the device usage log data. The method further includes clustering, using the at least one processing device, the users into multiple groups based on the one or more metrics. The method also includes identifying, using the at least one processing device, at least one of the groups as being at least one valid user group. In addition, the method includes providing, using the at least one processing device, one or more recommendations of at least one customized device setting to one or more of the user devices based on the device usage log data associated with the at least one valid user group.

In a second embodiment, an apparatus includes at least one processing device configured to obtain device usage log data associated with multiple user devices. The device usage log data is related to device settings associated with the user devices, where each device setting associated with the user devices is adjustable by users of the user devices. The at least one processing device is also configured to obtain one or more metrics representing each user's activeness in customizing one or more device settings of the user device associated with the user based on the device usage log data. The at least one processing device is further configured to cluster the users into multiple groups based on the one or more metrics and identify at least one of the groups as being at least one valid user group. In addition, the at least one processing device is configured to provide one or more recommendations of at least one customized device setting to one or more of the user devices based on the device usage log data associated with the at least one valid user group.

In a third embodiment, a non-transitory machine readable medium contains instructions that when executed cause at least one processor to obtain device usage log data associated with multiple user devices. The device usage log data is related to device settings associated with the user devices, where each device setting associated with the user devices is adjustable by users of the user devices. The non-transitory machine readable medium also contains instructions that when executed cause the at least one processor to obtain one or more metrics representing each user's activeness in customizing one or more device settings of the user device associated with the user based on the device usage log data. The non-transitory machine readable medium further contains instructions that when executed cause the at least one processor to cluster the users into multiple groups based on the one or more metrics and identify at least one of the groups as being at least one valid user group. In addition, the non-transitory machine readable medium contains instructions that when executed cause the at least one processor to provide one or more recommendations of at least one customized device setting to one or more of the user devices based on the device usage log data associated with the at least one valid user group.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code," "computer readable instructions," "machine readable program code," and "machine readable instructions" include any type of computer code, including source code, object code, and executable code. The phrases "computer readable medium" and "machine readable medium" include any type of medium capable of being accessed by a computer, such as read only memory (ROM), random access memory (RAM), a hard disk drive, a compact disc (CD), a digital video disc (DVD), or any other type of memory. A "non-transitory" computer or machine readable medium excludes wired, wireless, optical, or other communication links that transport transitory electrical or other signals. A non-transitory computer or machine readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to," Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the tennis and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology. Also note that "audio/visual" is used here to refer to audio, visual, or both. Thus, an "audio/visual device" may represent a device that provides audio content, visual content (such as images or video), or both.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 4A and 4B illustrate example device usage log data identifying device setting changes associated with multimedia or other user devices in accordance with this disclosure;

FIG. 5 illustrates example features that represent each user's activeness in making device setting changes in accordance with this disclosure;

FIGS. 9A through 9C illustrate an example method for clustering users based on device setting changes associated with multimedia or other user devices and related details in accordance with this disclosure.

DETAILED DESCRIPTION

Figure 1:
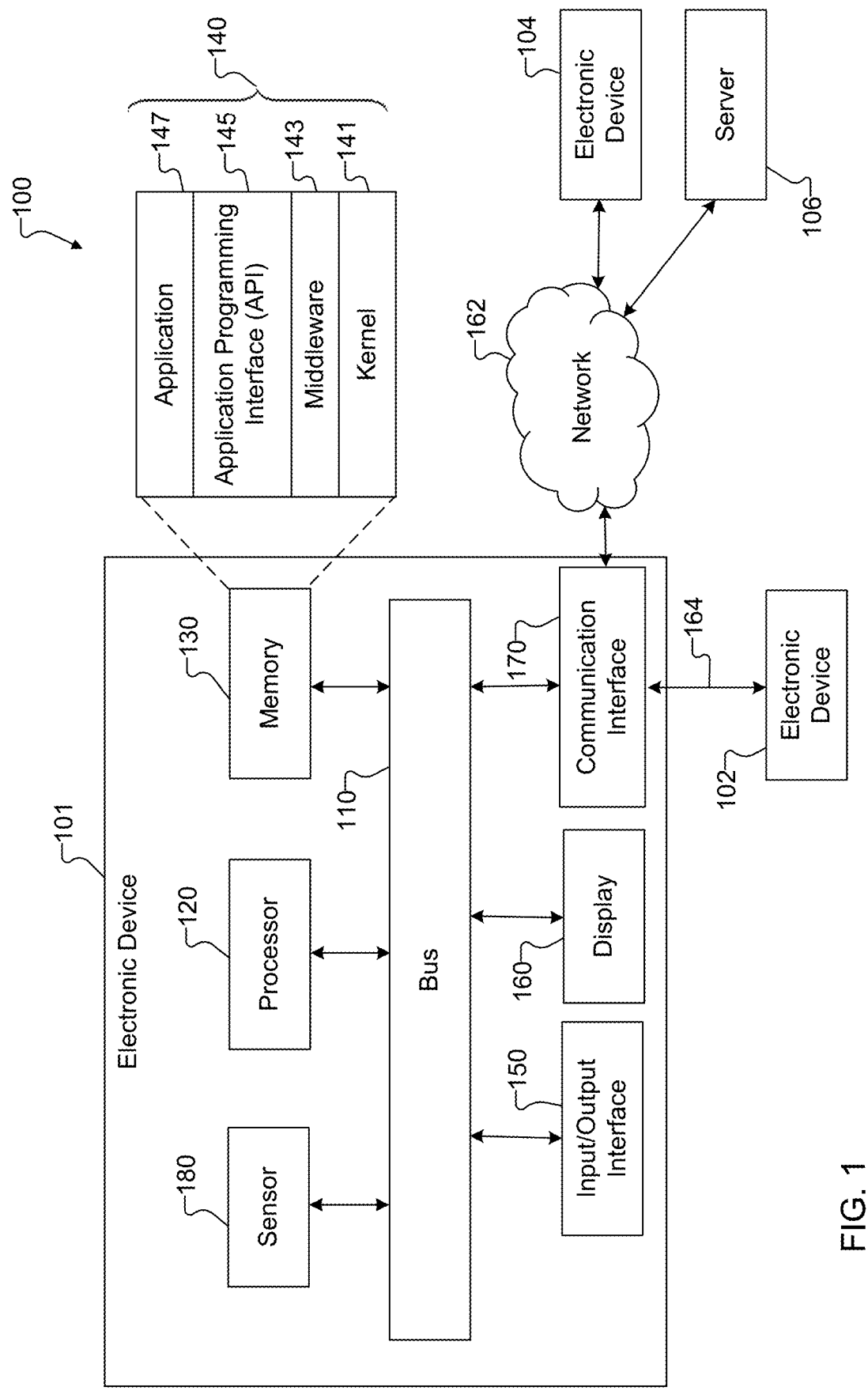
FIG. 1 illustrates an example network configuration including an electronic device in accordance with this disclosure.

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, various types of user devices have multiple settings that can be adjusted by users in order to alter operations of the user devices. For example, audio/visual devices (including multimedia devices) typically include various device settings that can control how audio or visual content is presented to users. As a particular example, televisions, computer monitors, and other display devices often support different picture modes, where each picture mode has specific settings related to brightness, contrast, color, sharpness, or other image characteristics. In many instances, display devices support a number of preset or predefined picture modes (such as standard, dynamic, natural, movie, or other modes), and the display devices alloy users to adjust certain settings in order to create customized picture modes. Similar approaches may be used for surround-sound audio receivers and other audio devices, which can support preset and customized audio modes.

In many instances, preset picture and audio modes are defined by device manufacturers based on input from audio/visual quality experts, who rely on their knowledge and experiences. The preset picture and audio modes are defined without consideration of actual preferences and situations of individual users. Moreover, only a relatively small number of users may actively utilize different picture or audio modes or otherwise change device settings of their user devices. Many users tend to use a default mode or select a single mode and use that mode continuously regardless of the circumstances. Because users often do not actively select or customize picture and audio modes or make other device setting changes, device manufacturers might find it useful to actively recommend different preset or customized modes or other settings to users. If the users like and accept the recommendations for the preset or customized picture and audio modes or other settings, this can lead to increased user satisfaction with their devices.

Unfortunately, identifying recommendations for picture and audio modes or other settings is not an easy task. Simply collecting information defining how different users set or adjust picture and audio settings of their devices and analyzing that information can produce incorrect or inappropriate device setting recommendations. Among other reasons, this is because data for many users would show that those users rarely if ever change device settings. As a result, designing a setting optimization engine or other logic based on data from users who rarely or never change device settings can lead to the generation of invalid recommendations, such as recommendations that provide wrong optimizations or that are irrelevant given the users' circumstances. Also, some users may appear to make device setting changes that are not expected or explainable, such as when a user increases a brightness setting for a display device despite the ambient environment around the display device becoming darker. Again, designing a setting optimization engine or other logic based on data from users who make unexplainable changes to device settings can lead to the generation of invalid recommendations. In addition, given large numbers of users and large amounts of data that those users' devices can generate, manually identifying users who make device setting changes for use in analysis and recommendation generation can be impractical or impossible.

This disclosure provides various techniques for generating device setting recommendations based on user activeness in configuring multimedia or other user device settings. As described in more detail below, device usage log data associated with multiple user devices can be obtained. The device usage log data can be related to device settings associated with the user devices, and each device setting associated with the user devices can be adjustable by users of the user devices. For instance, the device usage log data may include device settings for which users have changed picture or audio modes or changed other picture or audio settings. One or more metrics representing each user's activeness in customizing the device setting(s) of that user's device can be identified based on the device usage log data. The multiple users can be clustered into multiple groups based on the one or more metrics, and the clustering may involve identifying an optimal number of groups in which to cluster the multiple users (such as when the optimal number of groups is based on one or more clustering performance metrics). At least one of the groups can be identified as being at least one valid user group, such as when each valid user group is identified based on both (i) a consistency of the users within that user group in making changes to the device settings and (ii) an explainability of the users within that user group in making the changes to the device settings. One or more recommendations involving at least one customized device setting can be generated and provided to one or more of the user devices based on the device usage log data associated with the at least one valid user group.

The described techniques generally solve various issues related to generating device setting recommendations by (i) quantifying how active each user is in terms of changing device settings, (ii) identifying one or more groups of users who show relatively consistent and explainable device setting changes, and (iii) selecting and refining the identified users' data instances for use in identifying optimized device settings and recommendations. For example, the described techniques support the identification of quantifiable features or other variables that represent each user's activeness in making device mode changes or other device setting changes, and one or more metrics representing or based on the features or other variables can be generated using device usage log data. Moreover, the described techniques support clustering of users into different groups, such as by using a machine learning model engaged in unsupervised learning or other machine learning techniques. Device setting changes of each group of users can be analyzed in order to verify the consistency and explainability of the device setting changes, and the groups can be labeled (such as with "valid" and "invalid" labels) based on whether the device setting changes for users of that group are consistent and explainable. Note that continuous retraining or other retraining of the machine learning model used for clustering may be supported, such as based on log data or other data that is collected from new or previously-unseen users. In addition, the described techniques support the selection and refinement of high-quality log data based on which users are assigned to one or more "valid" user groups. This enables more-effective modeling of the users' behaviors, which also leads to the generation of more-accurate or more-effective device setting optimizations and recommendations.

In this way, the disclosed techniques enable identification of high-quality user-generated device usage log data. For example, the device usage log data that is selected for use can be associated with both consistent and explainable changes to device settings by users. As particular examples, the device usage log data that is selected for use can be associated with device setting changes that are reliable and reasonable, and the device setting changes can be limited to those that a prudent user would be expected to make. For instance, device setting changes associated with decreasing a brightness setting whenever ambient lighting gets lower may be considered prudent, and device setting changes contrary to that may be excluded. The ability to obtain device usage log data of high quality enables subsequent usage of the high-quality data in making user recommendations, such as when the high-quality data is used to train a machine learning model that performs device setting optimization and recommendation. Ideally, the usage of the high-quality data allows the machine learning model to make more-acceptable device setting recommendations for users, which can greatly increase acceptance of the device setting recommendations and improve overall user satisfaction, Note that, in the following discussion, it may often be assumed that the techniques described in this disclosure are being used to process log data and generate recommendations related to picture (video/image) device modes or other device settings for display devices like televisions and computer monitors. While this is one example application of the disclosed techniques, the disclosed techniques may be used to generate recommendations for any suitable device modes or other device settings with respect to any suitable user devices. This includes other settings related to display devices and audio modes or other settings for surround-sound receivers, amplifiers, or other audio devices.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 can allow users to change device settings associated with the electronic device 101 and can provide log data associated with device setting changes to an external destination for analysis. The processor 120 can also receive recommendations for device settings from an external source and implement the recommendations or provide the recommendations to at least one user for approval prior to implementation.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for controlling and allowing adjustments to device settings associated with the electronic device 101, logging data associated with device setting changes, and receiving and processing recommendations for device settings. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The electronic device 101 further includes one or more sensors 180 that can meter a physical quantity or detect an activation state of the electronic device 101 and convert metered or detected information into an electrical signal. For example, one or more sensors 180 may include one or more ambient light sensors, which may be used to measure ambient light in an environment around the electronic device 101. The one or more sensors 180 may include one or more microphones or other audio sensors, which may be used to capture audio data in the environment around the electronic device 101. The one or more sensors 180 may include one or more cameras or other imaging sensors for capturing images, one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 may include an inertial measurement unit, which can include one or more accelerometers, gyroscopes, and other components. In addition, the sensor(s) 180 may include a control circuit for controlling at least one of the sensors included here. Any of these sensor(s) 180 can be located within the electronic device 101.

One or both of the first external electronic device 102 and the second external electronic device 104 may represent devices that are usable with the electronic device 101. For example, if the electronic device 101 represents a television, computer monitor, or other display device, the electronic devices 102, 104 may represent one or more components that provide visual content (such as image or video content) to the display device for presentation. If the electronic device 101 represents a surround-sound receiver, amplifier, or other audio device, the electronic devices 102, 104 may represent one or more components that provide audio content to the audio device for presentation. Specific examples of the electronic devices 102, 104 in these cases might include audio/visual streaming devices, set-top boxes, digital video recorders, optical disc players, smart speakers, gaming consoles, or other components. Note, however, that this disclosure is not limited to any particular source or sources of audio/visual content or other content.

If the electronic device 101 supports wireless communication, the wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular or other wireless communication protocol. If the electronic device 101 supports wired communication, a wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can receive and process log data from the electronic device 101 and other electronic devices in order to support the identification of user data for use in generating device setting recommendations. The server 106 can also generate the device setting recommendations and provide the device setting recommendations to any of the electronic devices (including the electronic device 101) for implementation or other use.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
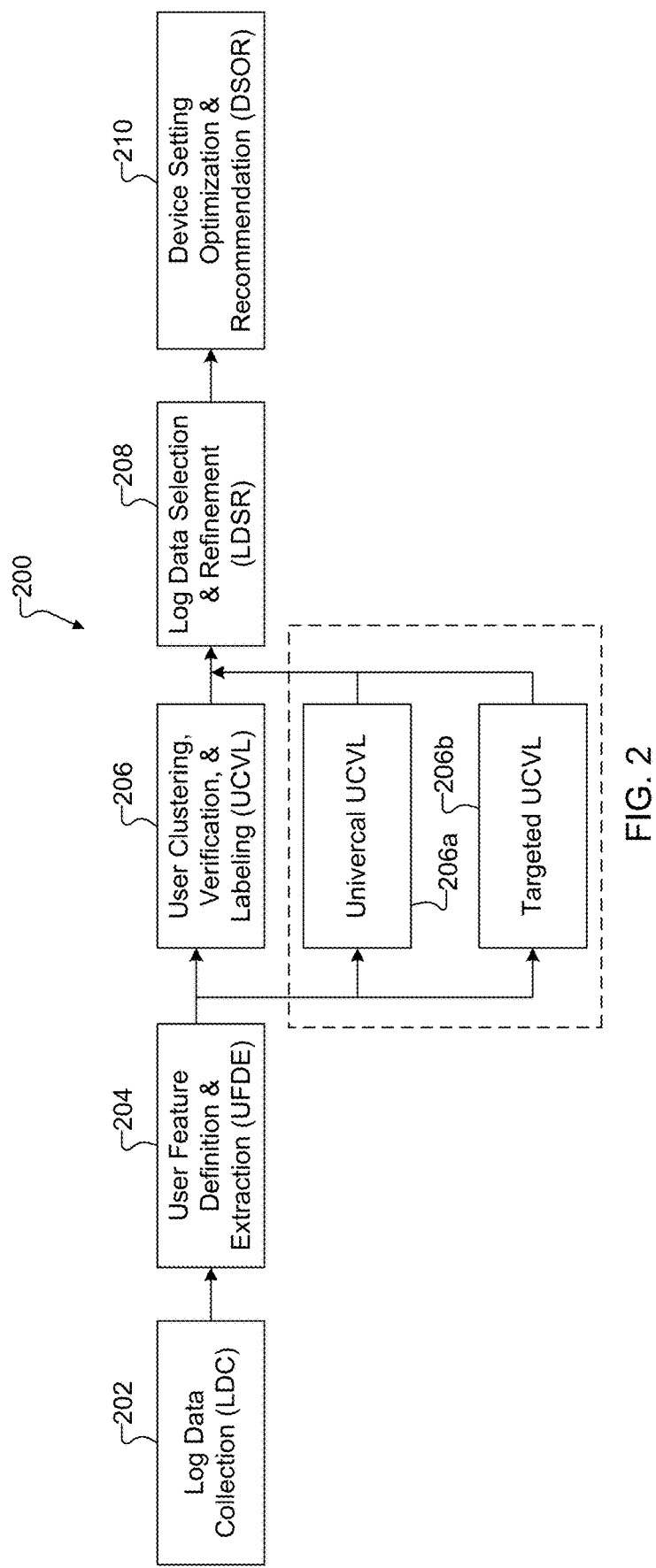
FIG. 2 illustrates an example architecture supporting the generation of device setting recommendations based on user activeness in configuring multimedia or other user device settings in accordance with this disclosure.

FIG. 2 illustrates an example architecture 200 supporting the generation of device setting recommendations based on user activeness in configuring multimedia or other user device settings in accordance with this disclosure. For ease of explanation, the architecture 200 shown in FIG. 2 is described as being implemented on or supported by the electronic device 101 and the server 106 in the network configuration 100 of FIG. 1. However, the architecture 200 shown in FIG. 2 could be used with any other suitable device(s) and in any other suitable system(s).

As shown in FIG. 2, the architecture 200 generally operates to obtain device usage log data associated with multiple user devices, such as multiple instances of the electronic device 101. The device usage log data identifies device setting activities associated with the user devices, such as instances where users made changes to one or more device settings of the user devices. The log data is processed in order to cluster users together into multiple groups based on their device setting activities, such as by clustering users based on how often the users change the device settings, under what circumstances the users change the device settings, and what changes are made to the device settings. The clusters can be processed in order to determine which clusters are valid and therefore useful in making device setting recommendations. Various device setting recommendations may be generated based on data associated with the valid user cluster(s), and the device setting recommendations can be provided to at least some of the user devices, such as the electronic device 101, for approval and implementation by those user devices.

In this example, the architecture 200 includes a log data collection (LDC) function 202, which in some instances may represent a function performed by the electronic device 101. The log data collection function 202 generally operates to collect log data representing one or more users' device setting activities in relation to the electronic device 101. In other words, the log data collection function 202 collects information related to how one or more users adjust one or more device settings of the electronic device 101 over time. The log data collection function 202 can be designed to unobtrusively collect log data, such as when the log data collection function 202 operates in the background to collect information about device settings and device setting changes.

The log data collection function 202 may collect any suitable information associated with device setting changes. In some cases, the log data collection function 202 can collect information that identifies various device settings of the electronic device 101 at specific times, such as each time a user makes a change to a device setting. In other cases, the log data collection function 202 can collect information that identifies a specific device setting that is adjusted and a value to which the specific device setting is adjusted. As particular examples, when a user changes a picture or audio mode of the electronic device 101, the log data collection function 202 may collect information that includes the new picture or audio mode. When a user changes a specific picture or audio setting of the electronic device 101, the log data collection function 202 may collect information that includes the new picture or audio setting. The log data collection function 202 may also collect information about the electronic device 101 itself or its surrounding environment, such as the model name of the electronic device 101 and one or more characteristics related to the electronic device 101 or to the environment around the electronic device 101. As particular examples, when a device setting change is detected, the log data collection function 202 may record the luminance (ambient light) in the environment around the electronic device 101 and the app being executed by the electronic device 101 when the user made the device setting change. At least some of this information may be obtained through software or through hardware sensors. Additional information, such as the timestamp for each device setting change, a device identifier, or a network address, can also be recorded. This information may be useful in subsequently providing customized recommendations for the specific user in the future.

The log data collection function 202 can collect any suitable amount of information regarding device setting activities over any suitable period of time. The log data collection function 202 can also transmit the collected information to at least one external destination (such as the server 106) for analysis. The transmission of the log data may be performed in any suitable manner. For example, in some cases, the log data collection function 202 may collect log data for at least a specified number of device setting activities (such as fifty or more device setting changes), or the log data collection function 202 may collect log data for at least a specified length of time (such as one or more weeks). Once any specified condition or conditions are met, the log data collection function 202 can transmit the collected information to the external destination(s). In other cases, the log data collection function 202 can transmit the collected information to the external destination(s) periodically (such as weekly) or at any other suitable time(s). In general, this disclosure is not limited to any specific mechanism or timing for transmitting log data.

Figure 3:
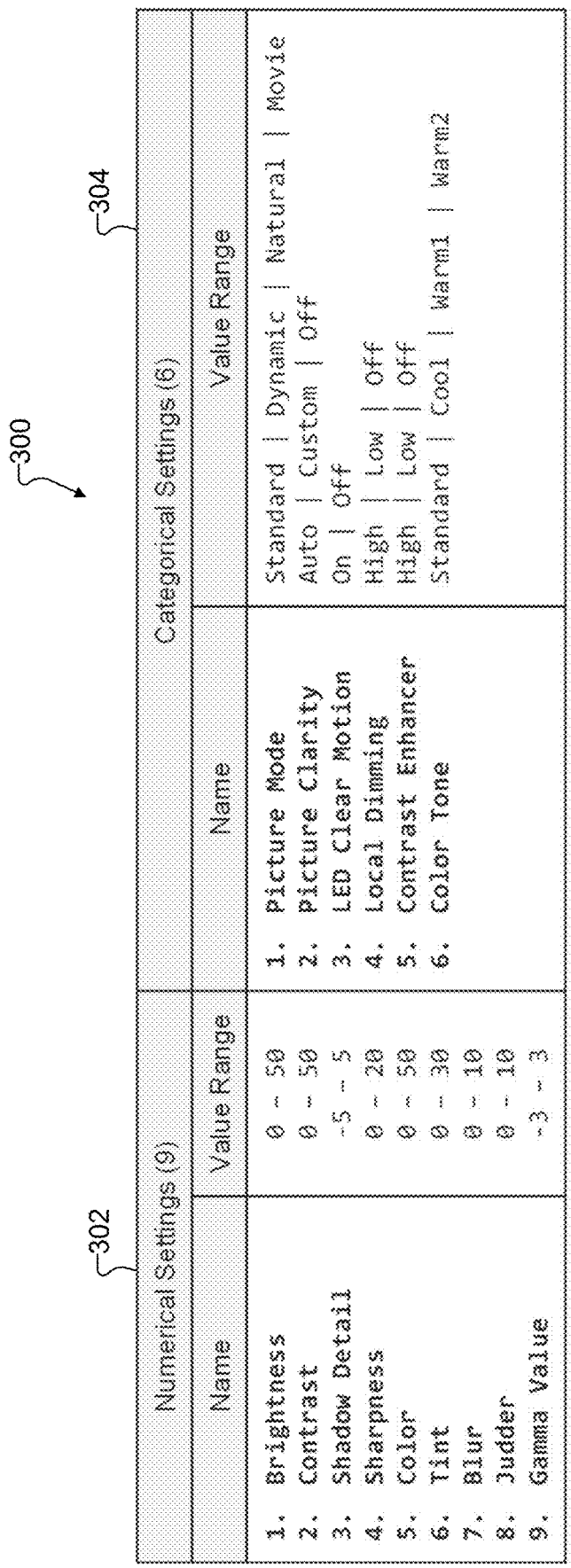
FIG. 3 illustrates example device settings for multimedia or other user devices in accordance with this disclosure.

FIG. 3 illustrates example device settings 300 for multimedia or other user devices in accordance with this disclosure. For example, the device settings 300 shown in FIG. 3 may represent device settings of the electronic device 101 that can be adjusted by one or more users, where changes to the device settings 300 can be recorded by the log data collection function 202. Note, however, that the device settings 300 shown in FIG. 3 are examples only and can easily vary depending on the circumstances, such as based on the type of electronic device 101 being used and the settings of the electronic device 101 for which a device manufacturer has elected to permit adjustments.

As shown in FIG. 3, the device settings 300 in this example are generally divided into two subsets, namely numerical settings 302 and categorical settings 304. The numerical settings 302 represent device settings where a user can specify numerical values for those device settings. In this particular example, the numerical settings 302 include settings related to brightness, contrast, level of shadow detail, sharpness, color, tint, blur, judder, and gamma value. Each of these numerical settings 302 has a range of values that the corresponding numerical setting 302 may be assigned by the user. The categorical settings 304 represent device settings where the user can select from various categories for those device settings. In this particular example, the categorical settings 304 include settings related to picture mode, picture clarify, LED clear motion (which adjusts backlighting to sharpen fast-moving images if enabled), local dimming, contrast enhancement, and color tone. Each of these categorical settings 304 has different values that the corresponding categorical setting 304 may be assigned by the user.

Figure 4A:
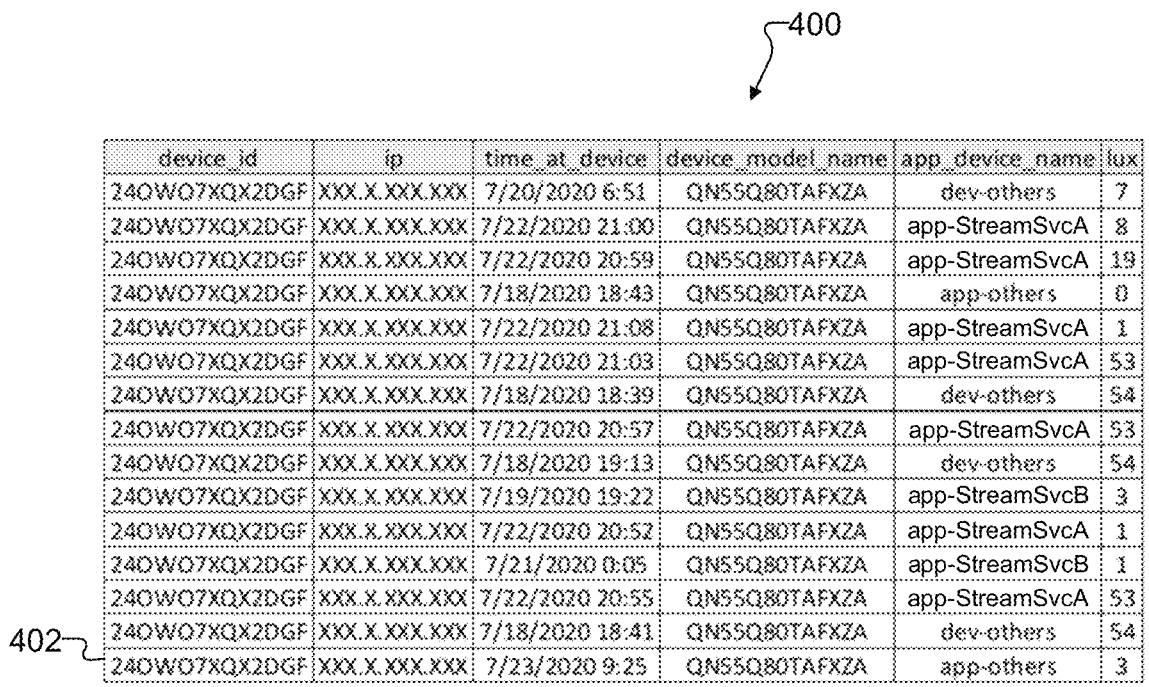

FIGS. 4A and 4B illustrate example device usage log data 400 identifying device setting changes associated with multimedia or other user devices in accordance with this disclosure. For example, the device usage log data 400 shown in FIGS. 4A and 4B may represent log data recorded by the log data collection function 202 in response to user changes to the device settings 300 of the electronic device 101. Note, however, that the contents of the device usage log data 400 shown in FIGS. 4A and 4B are examples only and can easily vary depending on the circumstances, such as based on which data the log data collection function 202 is designed to record.

As shown in FIG. 4A, the device usage log data 400 includes various entries 402, each of which may be associated with at least one change to at least one device setting. In this example, each entry 402 includes an identifier of the user device for which a device setting was changed, as well as the Internet Protocol (IP) or other network address associated with the user device, a timestamp of the device setting change, and a model name of the user device. Each entry 402 also includes the app being used by the user when the device setting was changed and the luminance (lux) of the ambient lighting around the user device when the device setting was changed. As shown in FIG. 4B, each entry 402 further includes information defining the device settings of the user device. In this particular example, each entry 402 includes information identifying the values of the various device settings 300 described above. Note that in this particular example, the device usage log data 400 identifies all values of the device settings 300, which allows a determination of how the device settings 300 change over time. However, other forms of the device usage log data 400 may be used. For instance, in other cases, the device usage log data 400 may identify only one or more changed device settings 300, such as when the device usage log data 400 identifies only the device setting or settings 300 that are adjusted and their adjusted values (without identifying device settings 300 that are not adjusted at those times).

Returning to FIG. 2, the architecture 200 also includes a user feature definition and extraction (UFDE) function 204, which in some instances may represent a function performed by the electronic device 101. The user feature definition and extraction function 204 generally operates to use up-to-date definitions of features or other variables in order to calculate values that quantify how active each user is in terms of utilizing device setting options on his or her user device. For example, the user feature definition and extraction function 204 can use log data collected by the log data collection function 202 (such as data in a device usage log data 400) in order to calculate the values of various features. In some cases, these calculated features may be combined to form feature vectors, such as where each feature vector includes multiple entries and each entry contains the value of a corresponding feature. The feature vectors or other feature values may be transmitted from the electronic device 101, such as to the server 106, for analysis. The feature vectors or other feature values may also be retained by the electronic device 101, such as for a specified period of time or until space is needed in memory.

Any suitable features may be used by the user feature definition and extraction function 204 and calculated using log data. FIG. 5 illustrates example features 500 that represent each user's activeness in making device setting changes in accordance with this disclosure, example, the features 500 shown in FIG. 5 may represent features that are used by the user feature definition and extraction function 204 to calculate feature vectors or other feature values based on data in a device usage log data 400.

As shown in FIG. 5, each feature 500 is identified by a feature name, and a corresponding description is provided for the feature 500. In this example, the features 500 include a total number of times that a user enters into a device setting screen on his or her user device for a given time period (such as a two-month period) and an average number of times that the user enters into the device setting screen on his or her user device for a given time period (such as per day). The features 500 also include a total amount of time (such as in seconds) that the user spent in the device setting screen for a given time period (such as a two-month period) and an average amount of time (such as in seconds) that the user spent in the device setting screen for a given time period (such as per day). The features 500 further include a total number of used device presets (such as a total number of different picture or audio modes) selected for use for a given time period (such as a two-month period) and an average number of used device presets (such as an average number of different picture or audio modes) selected for use for a given time period (such as per week). The features 500 may also include a total length or duration of a sequence of consecutive nonduplicated used presets for a given time period (such as a six-month period) and an average length of a sequence of consecutive nonduplicated used presets for a given time period (such as per month). In addition, the features 500 may include a number of distinct device setting configurations regardless of a currently-selected preset for a given time period and a number of distinct device setting configurations for a specific preset (such as "movie" picture mode or other audio/visual mode) for a given time period.

Returning to FIG. 2, the architecture 200 further includes a user clustering, verification, and labeling (UCVL) function 206, which in some instances may represent a function performed by the server 106 or cloud-based platform (such as the AMAZON WEB SERVICES or "AWS" platform). The user clustering, verification, and labeling function 206 generally operates to process the log data and features generated as described above for multiple user devices in order to cluster users of the multiple user devices into groups. The clustering can be performed in terms of the quantitative similarities of the users' device setting activities, which can be at least partially defined by the values of the features 500 described above. Part of the clustering functionality can also involve identifying an optimal number of groups in which to cluster the users. Various machine learning techniques or other techniques may be used to perform the clustering. In some embodiments, for instance, the optimal number of user groups may be determined based on calculating one or more clustering performance metrics, such as a within set sum of squared errors (WSSSE) and a silhouette coefficient (SC), within a K-means clustering algorithm. One example of this approach is described in more detail below.

Once the users are clustered, the user clustering, verification, and labeling function 206 verifies whether each group of users is valid (in terms of providing useful information for making device setting recommendations) and labels the groups. With respect to verifying whether each group of users is valid, the user clustering, verification, and labeling function 206 can verify whether the device setting changes associated with each group of users are consistent and explainable. In some cases, determining the consistency and explainability of device setting changes may be based on an association rule learning technique or similar technique. One example of this approach is described in more detail below. With respect to labeling, the user clustering, verification, and labeling function 206 can label each group of users as valid if the device setting changes of the users in that group are consistent and explainable. If not, the user clustering, verification, and labeling function 206 can label that group as invalid.

Note that the clustering, verification, and labeling described above may be performed for all collected log data or for a filtered or refined subset of the collected log data. For example, in some cases, all log data as contained in the device usage log data 400 from all user devices may be processed by the user clustering, verification, and labeling function 206 (optional pre-processing of this data may also occur). This type of processing may be referred to as "universal" user clustering, verification, and labeling (and is shown here as being performed using a universal UCVL function 206a). In other cases, log data that is selected for use may be associated with a specific targeted audience, such as for users of a specific television or other device model who are located within a specific country or other region(s). This type of processing may be referred to as "targeted" user clustering, verification, and labeling (and is shown here as being performed using a targeted UCVL function 206b). A combination of these or other approaches may also be used to refine a collection of log data into a sub-collection of log data that includes data to be processed. Regardless of the approach used, the log data that is selected for further processing may meet a minimum log data quality threshold, such as when the log data spans at least a minimum specified period of time and involves a minimum number of device setting changes.

Figure 6:
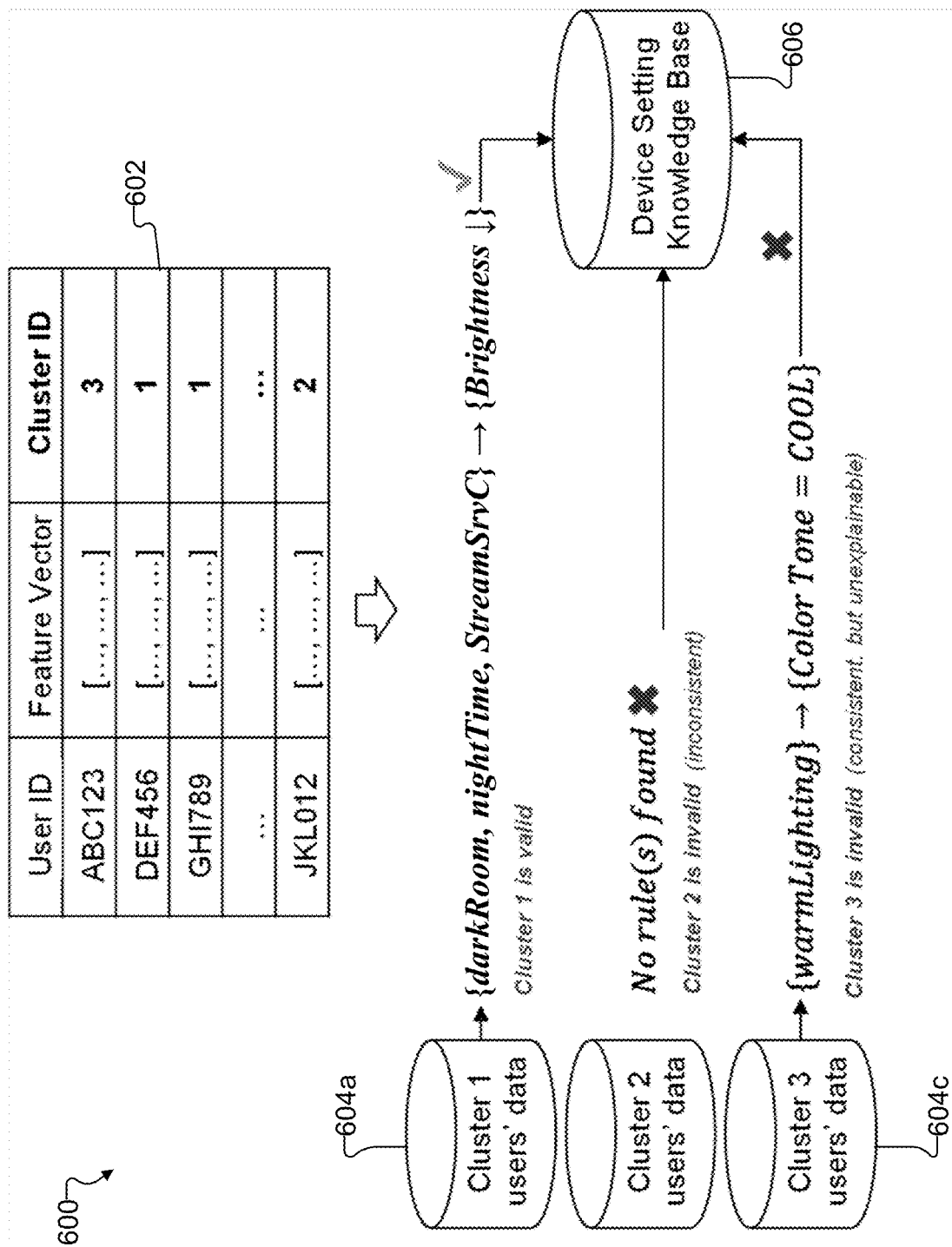
FIG. 6 illustrates an example process for clustering, verification, and labeling of users based on device setting changes associated with multimedia or other user devices in accordance with this disclosure.

FIG. 6 illustrates an example process 600 for clustering, verification, and labeling of users based on device setting changes associated with multimedia or other user devices in accordance with this disclosure. For example, the results shown in FIG. 6 may include labeled clusters determined by the user clustering, verification, and labeling function 206 based on collected device usage log data 400 from multiple user devices. As shown in FIG. 6, the clustering operations performed by the user clustering, verification, and labeling function 206 can result in the creation of multiple user groups, which in this example are defined using a table 602 (although the clusters may be defined in any other suitable manner). In this particular example, the table 602 identifies each user by using unique identifiers (IDs) and includes the feature vector associated with each user. The table 602 also includes a cluster identifier that identifies the group into which each user has been clustered.

The groups of users can be processed by the user clustering, verification, and labeling function 206 in order to identify which group or groups are valid and which group or groups are invalid. As noted above, each valid user group can be identified based on a consistency of the users within a specific user group in making device setting changes and an explainability of the users within the specific user group in making the device setting changes. In this example, the user clustering, verification, and labeling function 206 subdivides the log data being processed into multiple subsets 604a-604c of data, where each subset 604a-604c is associated with a different cluster or group of users. The user clustering, verification, and labeling function 206 processes the data within each subset 604a-604c in order to determine whether the corresponding cluster or group of users is considered valid. For example, the user clustering, verification, and labeling function 206 can determine whether the log data within each subset 604a-604c is generally consistent, such as by determining whether the log data contains user-initiated changes to device settings consistently associated with time, environmental conditions, or app usage over time (which is indicative of consistency). The user clustering, verification, and labeling function 206 can also determine whether the log data within each subset 604a-604c indicates that device setting changes are being made in a manner that a prudent user is expected to make. This can be based on knowledge of known or expected user behaviors.

Based on this type of analysis, in the example of FIG. 6, the user clustering, verification, and labeling function 206 generates three groups of users and generates three subsets 604a-604c of log data. In some embodiments, part of the clustering logic can involve an identification of the optimal number of clusters or groups, so the number of clusters and log data subsets can vary depending on the circumstances. The user clustering, verification, and labeling function 206 analyzes the log data in the subsets 604a-604c and determines that the first user group is valid based on the subset 604a. More specifically, the user clustering, verification, and labeling function 206 here determines that similar time, environmental conditions, or app usage are associated with at least one similar change to at least one device setting, and the device setting change is consistent and aligned with expected user behavior. However, the user clustering, verification, and labeling function 206 here also determines that the second and third user groups are invalid based on the subsets 604b-604c. This is because (i) the second subset 604b does not contain consistent user device setting changes and (ii) the third subset 604c contains consistent user device setting changes that are not explainable (meaning they are not aligned with an expected behavior since, based on research, it may be assumed in this example that warm lighting in a room typically causes users to prefer warmer color temperatures on display devices). The user clustering, verification, and labeling function 206 can store one or more labeled subsets of data associated with one or more user groups in a device setting knowledge base 606 for further processing.

Returning to FIG. 2, the architecture 200 also includes a log data selection and refinement (LDSR) function 208, which in some instances may represent a function performed by the server 106 or cloud-based platform. The log data selection and refinement function 208 generally operates to filter out invalid (inconsistent and/or unexplainable) log data based on the user clustering results. In some cases, this can include ignoring any invalid subsets of data in the device setting knowledge base 606. For example, the log data selection and refinement function 208 can generally exclude data associated with any groups of clustered users labeled as invalid, and the log data selection and refinement function 208 can select data associated with one or more groups of users labeled as valid for further processing. The log data selection and refinement function 208 can also perform post-processing of the valid log data. Post-processing can be performed, for instance, to exclude data associated with wrongly-collected device setting activities, such as when one or more device settings' values are out-of-range due to data collection errors. The post-processing can also be performed to rescale numerical device setting values (such as by resealing setting values that may range between 0 and 50 into decimal values between 0 and 1) for more-effective generation of device setting optimizations and recommendations.

In addition, the architecture 200 includes a device setting optimization and recommendation (DSOR) function 210, which in some instances may represent a function performed by the electronic device 101 or by the server 106 or cloud-based platform. The device setting optimization and recommendation function 210 generally operates to process data associated with one or more valid groups of users in order to identify optimized device settings that might be used to create recommendations for users of user devices. For example, the device setting optimization and recommendation function 210 may analyze the log data associated with any valid user group in order to extract new combinations of user-preferred device settings, which in some cases might represent user-preferred device modes or user-created custom device modes. The device setting optimization and recommendation function 210 can also predict and recommend optimal presets or other optimal device settings to users based on the specific circumstances of those users, such as based on the current time, environmental conditions, or app usage of those users.

The analysis of the log data associated with one or more valid user groups and the extraction of new combinations of user-preferred device settings may be performed in any suitable manner. In some embodiments, for example, the device setting optimization and recommendation function 210 may use one or more unsupervised machine learning techniques (such as K-prototypes clustering) in order to discover new device settings that are commonly preferred by users, and this knowledge may (among other things) be used to derive previously-unknown user-preferred presets. For instance, the device setting optimization and recommendation function 210 may learn that a group of users might use a "movie" or other preset and, under certain circumstances, increase a brightness setting from a value of 23 to a value of 43 or make one or more other changes to one or more settings associated with that preset.

The prediction and recommendation of optimal presets or other optimal device settings to users may also be performed in any suitable manner. In some embodiments, for example, the device setting optimization and recommendation function 210 may use one or more supervised machine learning techniques (such as a deep neural network) to learn relationships between user contexts/situations and resulting choices of specific presets or other specific device settings. The device setting optimization and recommendation function 210 can utilize these learned relationships to predict optimal device modes or other device settings given users' current conditions (such as time/environmental conditions/app usage) and recommend those device settings to the users. As a particular example, the device setting optimization and recommendation function 210 may learn that users who use a specific streaming video app in the evening or at night in a darker room routinely prefer to use a "movie" preset, and the device setting optimization and recommendation function 210 may recommend that setting to users who are currently in that type of situation.

Figure 7A:
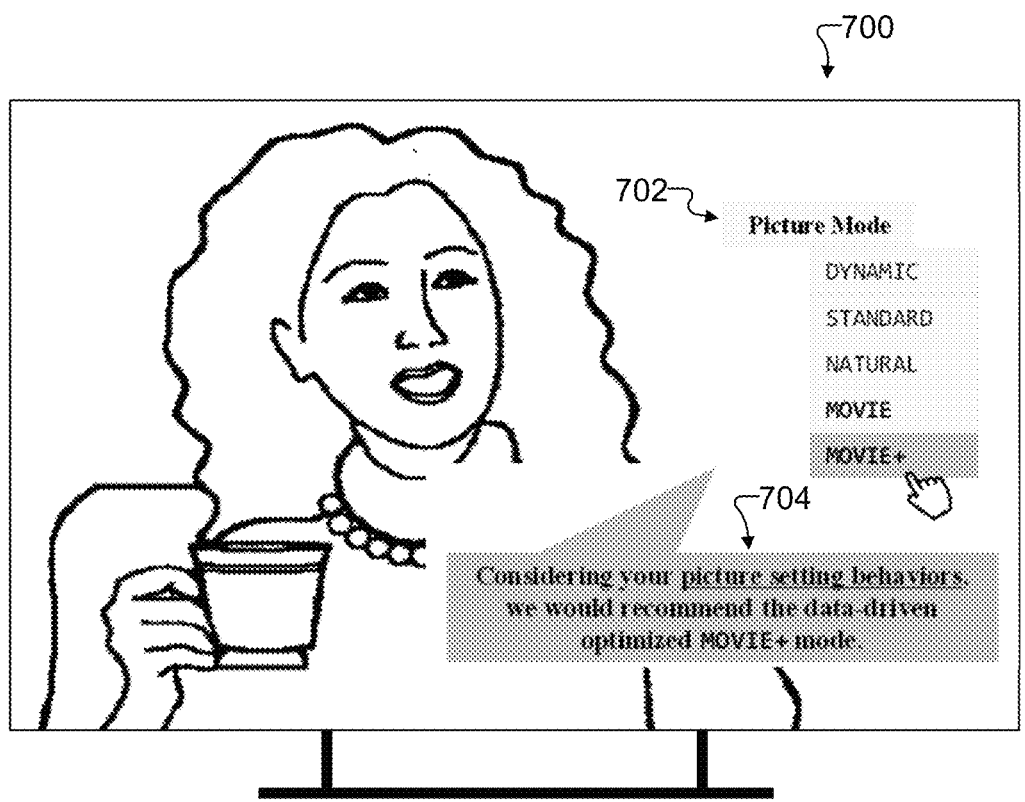
FIGS. 7A and 7B illustrate example user interfaces associated with recommended device settings in accordance with this disclosure.
Figure 7B:
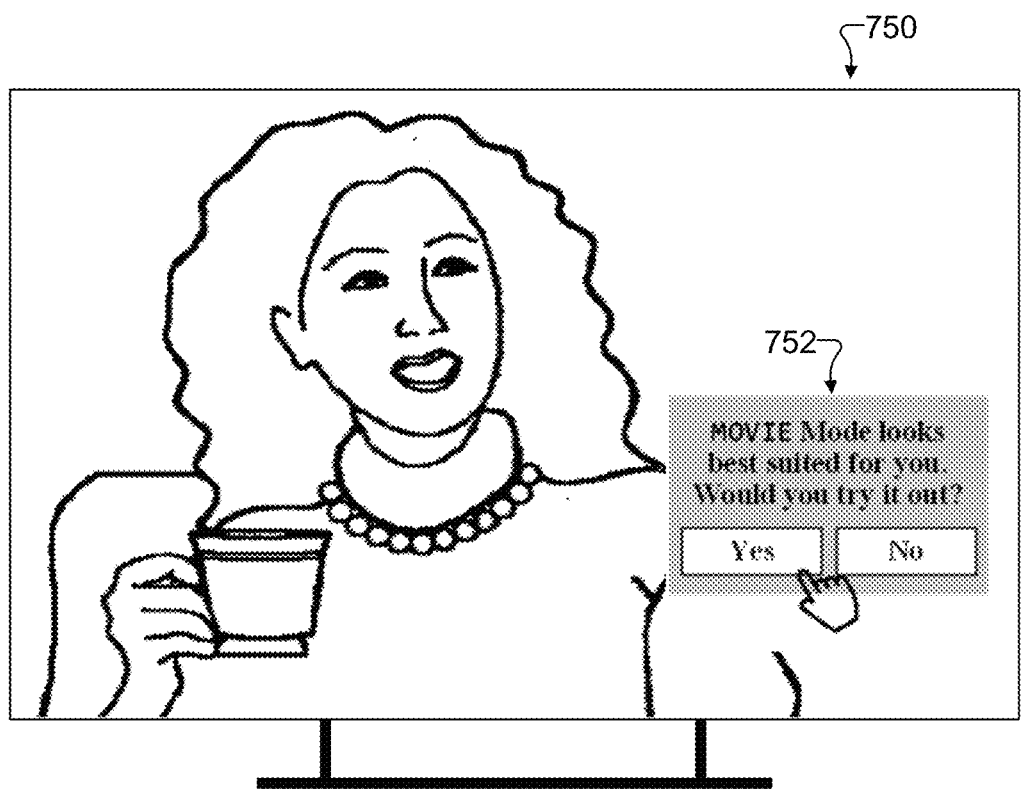

FIGS. 7A and 7B illustrate example user interfaces 700, 750 associated with recommended device settings in accordance with this disclosure. For example, the user interfaces 700, 750 may be used to present recommendations generated by the device setting optimization and recommendation function 210 to a user of a specific user device. In this particular example, the specific user device represents a television or other display device. However, recommendations may be provided to users of display devices or other user devices in any suitable manner, and this disclosure is not limited to any particular technique for presenting recommendations.

As shown in FIG. 7A, a user is viewing a television or other display device and watching video content, Here, a pop-up or other menu 702 allows the user to select among multiple predefined modes, which in this example include "Dynamic," "Standard," "Natural," and "Movie" picture modes. The device setting optimization and recommendation function 210 here has identified a new mode (referred to as a "Movie±" mode), which may represent one of the user-preferred modes with at least one modified device setting. The user interface 700 also provides a brief explanation 704 of the recommendation. If the user desires, the user may select the new mode (such as by using a pointing device or other remote control) and view the results on the display device.

As shown in FIG. 7B, a user is again viewing a television or other display device and watching video content. Here, the user has been using one predefined mode (such as "Standard" picture mode) or other mode to view the content, and the device setting optimization and recommendation function 210 here has identified another predefined mode (such as "Movie" picture mode) that the user might be interested in using based on his or her current situation. The user interface 750 provides a pop-up or other window 752 with the recommendation and asks if the user would like to accept the recommendation. If the user desires, the user may select the recommended mode (such as by using a pointing device or other remote control) and view the results on the display device.

Note that the examples shown in FIGS. 7A and 7B are two examples of how recommendations from the device setting optimization and recommendation function 210 might be provided to users. However, any other suitable techniques may be used to provide recommendations from the device setting optimization and recommendation function 210 to users. In general, graphical user interfaces are highly customizable and can easily vary depending on the circumstances, and this disclosure is not limited to any particular graphical user interfaces.

It should be noted that the functions shown in or described with respect to FIGS. 2 through 7B can be implemented in an electronic device 101, 102, 104, server 106, or other device or combination of devices in any suitable manner. For example, in some embodiments, at least some of the functions shown in or described with respect to FIGS. 2 through 7B can be implemented or supported using one or more software applications or other software instructions that are executed by the processor(s) 120 of the electronic device 101, 102, 104, server 106, or other device or combination of devices. In other embodiments, at least some of the functions shown in or described with respect to FIGS. 2 through 7B can be implemented or supported using dedicated hardware components. In general, the functions shown in or described with respect to FIGS. 2 through 7B can be performed using any suitable hardware or any suitable combination of hardware and software/firmware instructions. Also, the functions shown in or described with respect to FIGS. 2 through 7B can be performed by a single device or by multiple devices.

Although FIGS. 2 through 7B illustrate one example of an architecture 200 supporting the generation of device setting recommendations based on user activeness in configuring multimedia or other user device settings and related details, various changes may be made to FIGS. 2 through 7B. For example, various components and functions shown in FIG. 2 may be combined, further subdivided, replicated, omitted, or rearranged and additional components or functions may be added according to particular needs. As a particular example, a data security module may be added in the electronic device 101 or at another location and used to encrypt log data or other data, which can help to reduce or minimize data privacy risks. Also, while the various functions 202-210 are described above as being performed by specific devices (such as the electronic device 101 and the server 106), this is for illustration only and can easily vary. As a result, one or more of the functions 202-210 may be performed using a device or devices other than the specific devices mentioned above. As a particular example, the functions 206-210 may be performed in one or more edge computing environments for safe, scalable, and reliable data-driven device setting optimization and recommendation. In addition, the specific information and other contents shown in FIGS. 3 through 7B are examples only and are merely meant to illustrate details of example implementations or operations of the functions shown in FIG. 2.

Figure 8:
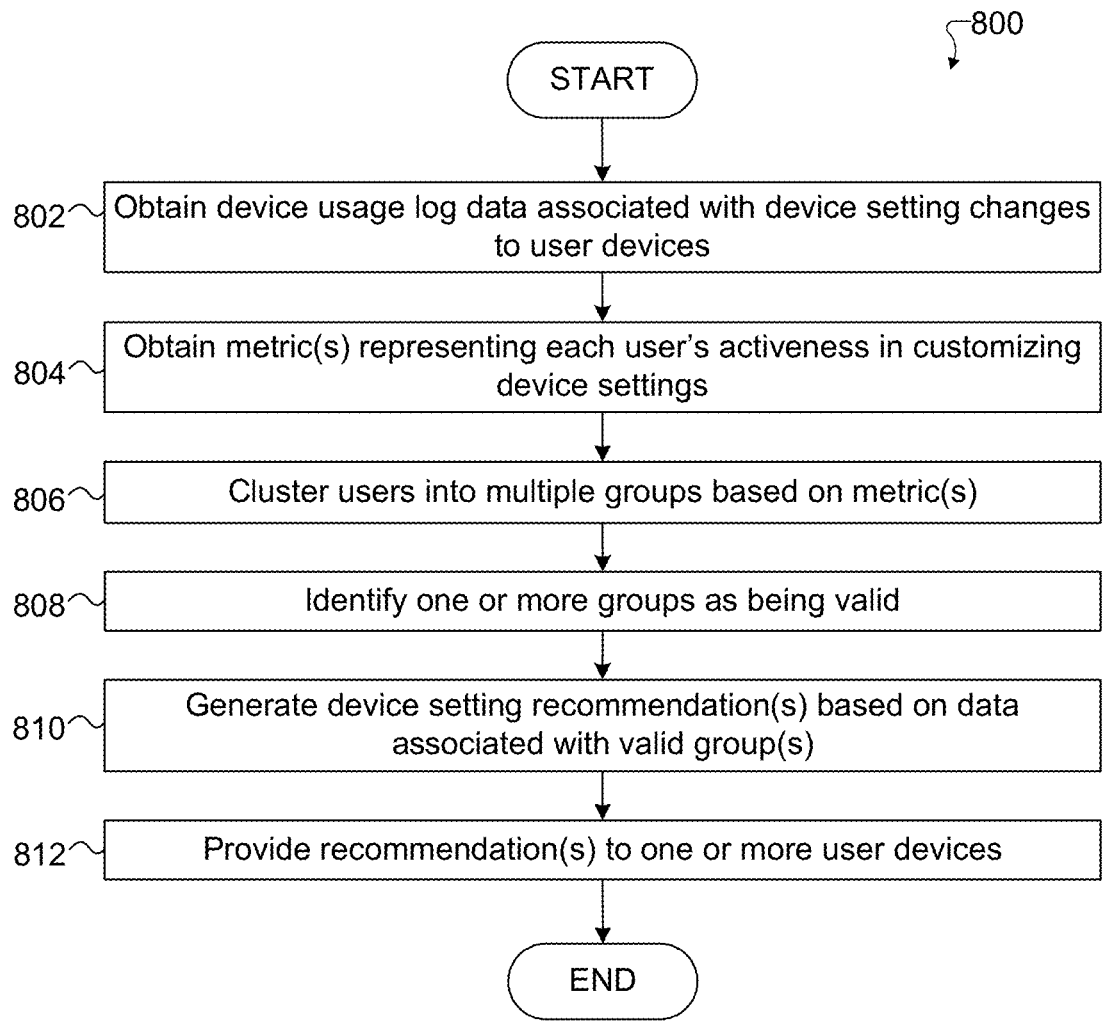
FIG. 8 illustrates an example method for generating device setting recommendations based on user activeness in configuring multimedia or other user device settings in accordance with this disclosure.

FIG. 8 illustrates an example method 800 for generating device setting recommendations based on user activeness in configuring multimedia or other user device settings in accordance with this disclosure. For ease of explanation, the method 800 is described as being performed by multiple instances of the electronic device 101 and the server 106 in the network configuration 100 of FIG. 1 using the architecture 200 of FIG. 2. However, the method 800 may be performed using any other suitable device(s) or architecture(s) and in any other suitable system(s).

As shown in FIG. 8, device usage log data associated with multiple user devices is obtained at step 802. This may include, for example, multiple instances of the electronic device 101 performing the log data collection function 202 to generate device usage log data 400. This may also include the server 106 obtaining the device usage log data 400 from the electronic devices 101. The device usage log data can relate to various device settings associated with the user devices, and each device setting can be adjustable by a user of the corresponding user device. One or more metrics representing each user's activeness in customizing one or more device settings of the user device associated with the user are obtained at step 804. This may include, for example, the multiple instances of the electronic device 101 performing the user feature definition and extraction function 204 in order to calculate various feature vectors or other feature values for the features 500, where the feature vector or other feature values for each user are generated based on the device usage log data 400 for that user. This may also include the server 106 obtaining the feature vectors or other feature values from the electronic devices 101.

The users are clustered into multiple groups based on the one or more metrics at step 806, and at least one of the user groups is identified as being valid at step 808. This may include, for example, the server 106 performing the user clustering, verification, and labeling function 206 to cluster the users of the electronic devices 101 into groups based on the feature vectors or other feature values. In some embodiments, the clustering may be performed using a K-means clustering algorithm. Part of the clustering may include identifying an optimal number of user groups in which to cluster the users. In some embodiments, the optimal number of user groups may be determined based on one or more clustering performance metrics, such as a within set sum of squared errors and a silhouette coefficient. This may also include the server 106 performing the user clustering, verification, and labeling function 206 to verify whether each user group is valid and labeling the user groups based on the validity determinations. The determination of whether each user group is valid can be based on (i) a consistency of the users within that user group in making changes to device settings and (ii) an explainability of the users within that user group in making the changes to the device settings.

One or more device setting recommendations are generated based on the data associated with the one or more valid user groups at step 810. This may include, for example, the server 106 performing the log data selection and refinement function 208 to select one or more subsets of data associated with the one or more valid user groups, such as one or more subsets of the device usage log data 400 associated with the one or more valid user groups. This may also include the server 106 performing the device setting optimization and recommendation function 210 to extract one or more new combinations of user-preferred device settings from the subset(s) of the device usage log data 400. In some embodiments, the device setting optimization and recommendation function 210 may use one or more unsupervised machine learning techniques (such as K-prototypes clustering) to discover new device settings that are commonly preferred by users. This may further include the server 106 performing the device setting optimization and recommendation function 210 to predict and recommend one or more optimal presets or other optimal device settings to users based on the current circumstances of those users. In some embodiments, the device setting optimization and recommendation function 210 may use one or more supervised machine learning techniques (such as a deep neural network) to predict optimal device modes or other device settings given the users' current conditions (such as the users' current time/environmental conditions/app usage).

The one or more device recommendations are provided to one or more users at step 812. This may include, for example, the server 106 communicating each recommendation to one or more electronic devices 101 identified as being likely to accept that recommendation. This may also include each of those one or more electronic devices 101 presenting the recommendation on a display or otherwise making the recommendation available for approval or rejection by the associated user and implementing the recommendation if approved by the user.

Although FIG. 8 illustrates one example of a method 800 for generating device setting recommendations based on user activeness in configuring multimedia or other user device settings, various changes may be made to FIG. 8. For example, while shown as a series of steps, various steps in FIG. 8 may overlap, occur in parallel, occur in a different order, or occur any number of times.

Figure 9A:
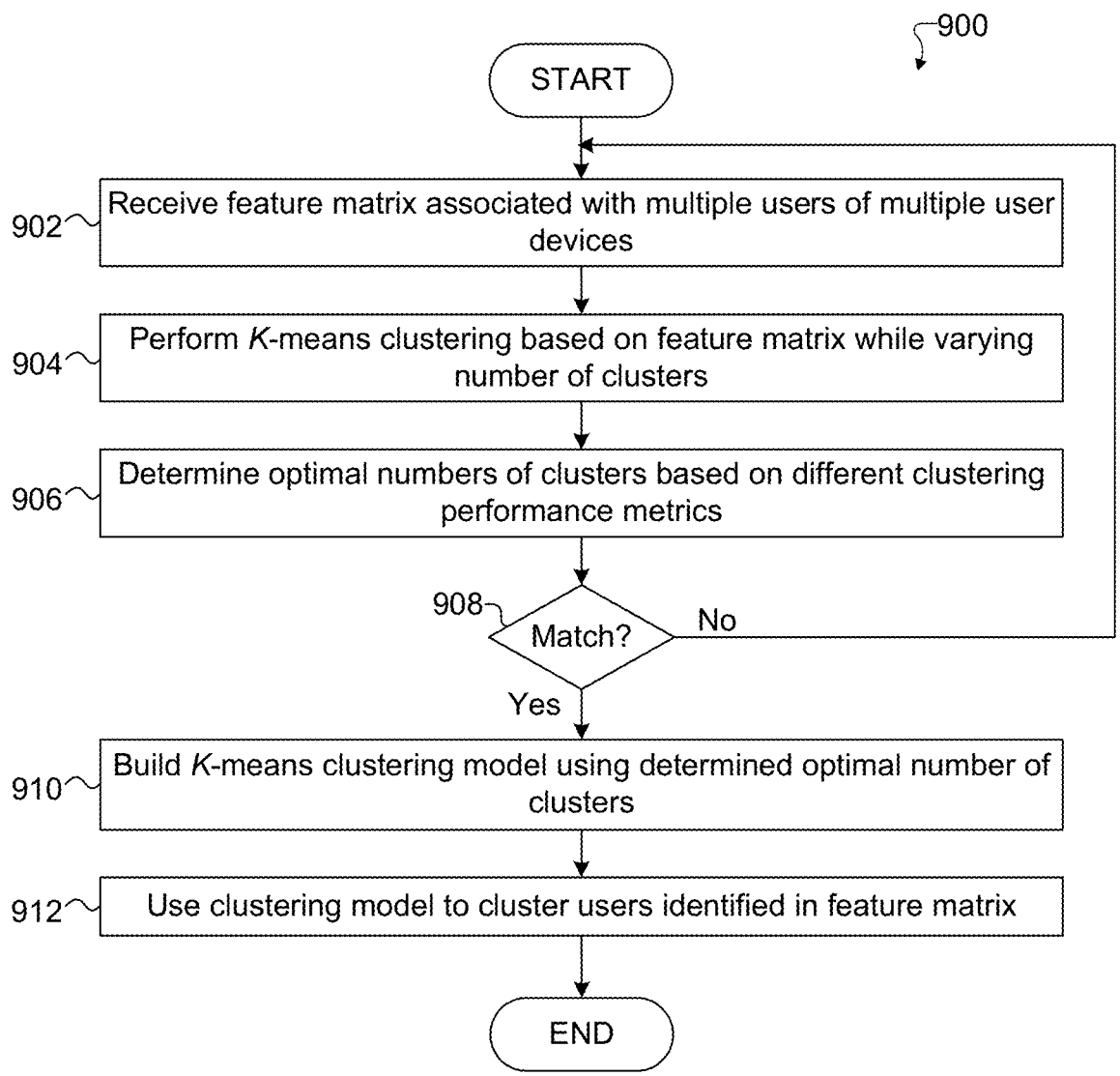

FIGS. 9A through 9C illustrate an example method 900 for clustering users based on device setting changes associated with multimedia or other user devices and related details in accordance with this disclosure. For ease of explanation, the method 900 is described as being performed by the server 106 in the network configuration 100 of FIG. 1. As a particular example, the method 900 may be used as part of step 806 in the method 800 of FIG. 8. However, the method 900 may be performed using any other suitable device(s) and in any other suitable system(s).

As shown in FIG. 9A, a feature matrix associated with users of user devices is obtained at step 902. This may include, for example, the server 106 performing the user clustering, verification, and labeling function 206 to combine feature vectors or other feature values associated with users of multiple electronic devices 101 into a combined matrix. K-means clustering is performed based on the feature matrix while varying the number of potential clusters at step 904. This may include, for example, the server 106 performing the user clustering, verification, and labeling function 206 to perform a K-means clustering algorithm that involves calculating clustering performance metrics, where the clustering algorithm can be performed and the clustering performance metrics can be calculated for an increasing or other variable number of clusters. As a particular example, the number of clusters may be increased from 2 to N, where N represents the maximum number of clusters that is permissible.

In some embodiments, the clustering performance metrics include a within set sum of squared errors (WSSSE) and a silhouette coefficient (SC), and each of the WSSSE and SC metrics can be calculated for each number of clusters being examined. The WSSSE metrics can be determined as follows.

$$WSSSE_K = \sum_{k=1}^{K} \sum_{i \in S_k} \sum_{j=1}^{p} (d(x_{ij}, x_{kj}))^2$$

Here, $S_k$ represents a set of observations in the $k^{th}$ cluster (where k=1, ..., K), $x_{ij}$ represents the $j^{th}$ variable (j=1, ..., p) of the $i^{th}$ data point belonging to the $k^{th}$ cluster, $x_{kj}$ represents the $j^{th}$ variable (j=1, ..., p) of the cluster centroid for the $k^{th}$ cluster, and d represents a distance function between two data points (which in some cases may represent a Euclidean distance). Also, the SC metrics can be determined as follows.

$$C_K = \sum_{k=1}^{K} \frac{1}{N} \sum_{i=1}^{N} \frac{b(x_i) - a(x_i)}{\max\{a(x_i), b(x_i)\}}$$

Here, $x_i$ represents the data point in an entire dataset (i=1, ..., N), $a(x_i)$ represents an average distance of $x_i$ to all other data points in the same cluster, and $b(x_i)$ represents an average distance of $x_i$ to the data points in other clusters.

Optimal numbers of clusters are determined based on different ones of the clustering performance metrics at step 906. This may include, for example, the server 106 performing the user clustering, verification, and labeling function 206 to identify an optimal value of K based on each clustering performance metric separately. As a particular example, this may include generating one value of K based on the WSSSE metrics (denoted $K_{WSSSE}$) and one value of K based on the SC metrics (denoted $K_{SC}$). In some embodiments, the values of $K_{WSSSE}$ and $K_{SC}$ may be determined as follows.

$$K_{WSSSE} = \underset{k}{\operatorname{argmin}} \left\{ \sum_{k=2}^{K} |WSSSE_k - WSSSE_{k-1}| \right\}$$

$$K_{SC} = \underset{K}{\operatorname{argmax}} \{SC_1, ..., SC_K\}$$

A determination is made whether the different values of K match at step 908. If not, the process can return to step 902 to process other or additional data. Otherwise, the common value of K determined using the different clustering performance metrics is selected as the optimal number of clusters and used to build a K-means clustering model at step 910. This may include, for example, the server 106 performing the user clustering, verification, and labeling function 206 to build a clustering model that can cluster each of multiple users into one of user groups (where K=$K_{WSSSE}$=$K_{SC}$, K≥2). The K-means clustering model is used to cluster the users identified in the feature matrix at step 912. This may include, for example, the server 106 performing the user clustering, verification, and labeling function 206 to group the users based on their feature vectors or other feature values contained in the feature matrix, where each of the users is clustered into one of the K user groups.

FIGS. 9B and 9C illustrate how the WSSSE and SC metrics can be used to separately select the optimal numbers of clusters $K_{WSSSE}$ and $K_{SC}$. In FIG. 9B, a chart 940 plots the WSSSE values calculated using different numbers of clusters (K). Here, the optimal number $K_{WSSSE}$ can be selected by identifying the value of K that results in the largest decrease in the clustering error rate. This approach can sometimes be referred to as the "elbow" technique, which essentially looks at the trade-off between increased calculation complexities in view of diminishing returns in order to select an appropriate value for a variable. In FIG. 9C, a chart 960 plots the SC values calculated using different numbers of clusters (K). Here, the optimal number $K_{SC}$ can be selected by identifying the value of K that maximizes the calculated silhouette coefficient involving the clusters. Silhouette coefficient values can be used as a measure of how similar a data item is to its own cluster compared to other clusters, so maximizing the SC value can help to facilitate more effective clustering.

Although FIGS. 9A through 9C illustrate one example of a method 900 for clustering users based on device setting changes associated with multimedia or other user devices and related details, various changes may be made to FIGS. 9A through 9C. For example, while shown as a series of steps, various steps in FIG. 9A may overlap, occur in parallel, occur in a different order, or occur any number of times. Also, the contents shown in the charts 940 and 960 of FIGS. 9B and 9C can easily vary depending on the circumstances, which can result in different values being selected for $K_{WSSSE}$ and $K_{SC}$. In addition, any other suitable clustering technique may be supported here.

Figure 10:
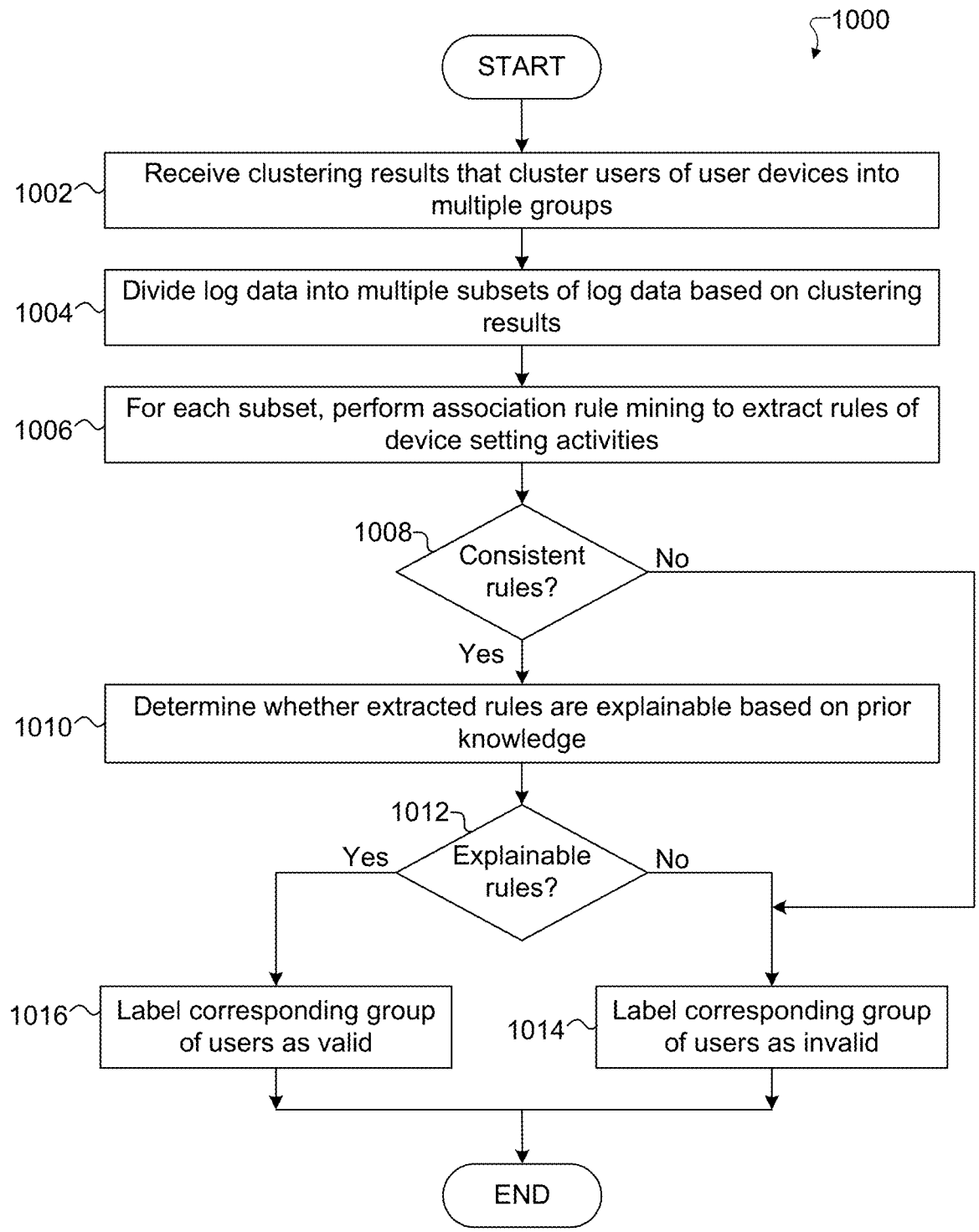
FIG. 10 illustrates an example method for verifying and labeling clusters of users to support the generation of device setting recommendations based on user activeness in configuring multimedia or other user device settings in accordance with this disclosure.

FIG. 10 illustrates an example method 1000 for verifying and labeling clusters of users to support the generation of device setting recommendations based on user activeness in configuring multimedia or other user device settings in accordance with this disclosure. For ease of explanation, the method 1000 is described as being performed by the server 106 in the network configuration 100 of FIG. 1. As a particular example, the method 1000 may be used as part of one or both of steps 806 and 808 in the method 800 of FIG. 8. However, the method 1000 may be performed using any other suitable device(s) and in any other suitable system(s).

As shown in FIG. 10, clustering results that cluster users of multiple user devices into groups is obtained at step 1002. This may include, for example, the server 106 generating or otherwise obtaining the results of the clustering from step 806 of FIG. 8 or generating or otherwise obtaining the results of the method 900 of FIG. 9. In some cases, the clustering results may represent user identifier-cluster identifier pairs {user ID, cluster ID}, where the user associated with each user identifier is clustered into the group associated with the corresponding cluster identifier. Log data associated with the user devices is divided into multiple subsets of log data at step 1004. This may include, for example, the server 106 performing the user clustering, verification, and labeling function 206 to split the collected device usage log data 400 from various electronic devices 101 into subsets 604a-604c based on the groups into which the associated users are clustered.

For each subset, association rule mining is performed using that subset to extract one or more rules for that subset at step 1006. This may include, for example, the server 106 performing the user clustering, verification, and labeling function 206 to analyze the data in each subset 604a-604c and attempt to derive rules that indicate certain patterns of device setting changes made based on that subset 604a-604c. As a particular example, the association rule mining may be used to generate rules that identify instances of specific device setting changes that repeatedly occurred in response to specific times/environmental conditions/app usages.

A determination is made whether the rules for each subset are consistent with one another at step 1008. This may include, for example, the server 106 performing the user clustering, verification, and labeling function 206 to determine whether the extracted rules for each subset 604a-604c identify the same or similar device setting changes and the same or similar conditions for making the device setting changes. If not, the rules may be regarded as being inconsistent, and the group of users associated with any subset having inconsistent device setting change rules can be labeled as invalid at step 1014.

For each subset having consistent rules, a determination is made whether the rules are explainable based on prior knowledge at step 1010. This may include, for example; the server 106 performing the user clustering, verification, and labeling function 206 to determine whether the extracted rules for at least one subset 604a-604c are reasonable (such as aligned with) research about prudent or likely user behaviors regarding device settings (such as user-preferred display color setting according to ambient lighting conditions). If it is determined at step 1012 that the rules for any subset are not explainable, the rules may be regarded as being unexplainable, and the group of users associated with any subset having unexplainable device setting change rules can be labeled as invalid at step 1014. Otherwise, the group of users associated with any subset having both consistent and explainable device setting change rules can be labeled as valid at step 1016.

Although FIG. 10 illustrates one example of a method 1000 for verifying and labeling clusters of users to support the generation of device setting recommendations based on user activeness in configuring multimedia or other user device settings, various changes may be made to FIG. 10. For example, while shown as a series of steps, various steps in FIG. 10 may overlap, occur in parallel, occur in a different order, or occur any number of times. Also, any other suitable verification and labeling technique may be supported here.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processing device, device usage log data associated with multiple user devices, the device usage log data related to device settings associated with the user devices, wherein each device setting associated with the user devices is adjustable by users of the user devices;
   obtaining, from the device usage log data using the at least one processing device, one or more metrics quantifying each user's history of customizing one or more device settings of the user device associated with the user, wherein the one or more metrics are calculated values from a user feature and extraction function;
   clustering, using the at least one processing device, the users into multiple groups based on the one or more metrics;
   identifying, using the at least one processing device, at least one of the groups as being at least one valid user group;
   generating one or more recommendations of at least one customized device setting for the at least one valid user group based on the device usage log data associated with the at least one valid user group; and providing, using the at least one processing device, the one or more recommendations to one or more of the user devices associated with the at least one valid user group.

2. The method of claim 1, wherein each valid user group is identified based on (i) a consistency of the users within that group in making changes to the device settings and (ii) an explainability of the users within that group in making the changes to the device settings.

3. The method of claim 1, further comprising:
selecting a subset of the device usage log data associated with the at least one valid user group; and
generating the one or more recommendations based on the subset of the device usage log data.

4. The method of claim 3, wherein selecting the subset of the device usage log data comprises selecting the subset of the device usage log data based on an identified log data quality threshold.

5. The method of claim 3, wherein selecting the subset of the device usage log data comprises refining a collection of log data that includes the device usage log data into a sub-collection of log data that includes the subset of the device usage log data.

6. The method of claim 1, wherein the one or more metrics are based on one or more features representing each user's activeness in customizing the one or more device settings of the user device associated with the user.

7. The method of claim 1, wherein clustering the users into the groups comprises identifying an optimal number of groups in which to cluster the users, the optimal number of groups based on one or more clustering performance metrics.

8. The method of claim 1, wherein:
the user devices comprise audio/visual devices;
the device settings associated with the user devices comprise at least one of audio/visual modes or individual audio/visual settings of the audio/visual devices; and
the at least one customized device setting comprises at least one of:
a customized audio/visual setting;
a specified one of the audio/visual modes; or
a new audio/visual mode with at least one custom audio/visual setting.

9. An apparatus comprising:
at least one processing device configured to:
obtain device usage log data associated with multiple user devices, the device usage log data related to device settings associated with the user devices, wherein each device setting associated with the user devices is adjustable by users of the user devices;
obtain, from the device usage log data, one or more metrics quantifying each user's history of customizing one or more device settings of the user device associated with the user, wherein the one or more metrics are calculated values from a user feature and extraction function;
cluster the users into multiple groups based on the one or more metrics;
identify at least one of the groups as being at least one valid user group;
generate one or more recommendations of at least one customized device setting for the at least one valid user group based on the device usage log data associated with the at least one valid user group; and
provide the one or more recommendations to one or more of the user devices associated with the at least one valid user group.

10. The apparatus of claim 9, wherein the at least one processing device is configured to identify each valid user group based on (i) a consistency of the users within that group in making changes to the device settings and (ii) an explainability of the users within that group in making the changes to the device settings.

11. The apparatus of claim 9, wherein the at least one processing device is further configured to:
select a subset of the device usage log data associated with the at least one valid user group; and
generate the one or more recommendations based on the subset of the device usage log data.

12. The apparatus of claim 11, wherein the at least one processing device is configured to select the subset of the device usage log data based on an identified log data quality threshold.

13. The apparatus of claim 11, wherein, to select the subset of the device usage log data, the at least one processing device is configured to refine a collection of log data that includes the device usage log data into a sub-collection of log data that includes the subset of the device usage log data.

14. The apparatus of claim 9, wherein the one or more metrics are based on one or more features representing each user's activeness in customizing the one or more device settings of the user device associated with the user.

15. The apparatus of claim 9, wherein, to cluster the users into the groups, the at least one processing device is configured to identify an optimal number of groups in which to cluster the users, the optimal number of groups based on one or more clustering performance metrics.

16. The apparatus of claim 9, wherein:
the user devices comprise audio/visual devices;
the device settings associated with the user devices comprise at least one of audio/visual modes or individual audio/visual settings of the audio/visual devices; and
the at least one customized device setting comprises at least one of:
a customized audio/visual setting;
a specified one of the audio/visual modes; or
a new audio/visual mode with at least one custom audio/visual setting.

17. A non-transitory machine readable medium containing instructions that when executed cause at least one processor to:
obtain device usage log data associated with multiple user devices, the device usage log data related to device settings associated with the user devices, wherein each device setting associated with the user devices is adjustable by users of the user devices;
obtain, from the device usage log data, one or more metrics quantifying each user's history of customizing one or more device settings of the user device associated with the user, wherein the one or more metrics are calculated values from a user feature and extraction function;
cluster the users into multiple groups based on the one or more metrics;
identify at least one of the groups as being at least one valid user group;
generate one or more recommendations of at least one customized device setting for the at least one valid user group based on the device usage log data associated with the at least one valid user group; and
provide the one or more recommendations to one or more of the user devices associated with the at least one valid user group.

18. The non-transitory machine readable medium of claim 17, wherein the instructions when executed cause the at least one processor to identify each valid user group based on (i) a consistency of the users within that group in making changes to the device settings and (ii) an explainability of the users within that group in making the changes to the device settings.

19. The non-transitory machine readable medium of claim 17, wherein the one or more metrics are based on one or more features representing each user's activeness in customizing the one or more device settings of the user device associated with the user.

20. The non-transitory machine readable medium of claim 17, wherein the instructions that when executed cause the at least one processor to cluster the multiple users into the multiple groups comprise:
    instructions that when executed cause the at least one processor to identify an optimal number of groups in which to cluster the users, the optimal number of groups based on one or more clustering performance metrics.

* * * * *